United States Patent [19]
Moore

[11] Patent Number: 6,021,689
[45] Date of Patent: Feb. 8, 2000

[54] PUSH-PULL CONTROL CABLE ASSEMBLY WITH QUICK-RELEASE TERMINAL FITTINGS THEREFOR

[75] Inventor: Bruce H. Moore, Kent, Ohio

[73] Assignee: Flex Technolgoies, Inc., Midvale, Ohio

[21] Appl. No.: 09/300,896

[22] Filed: Apr. 28, 1999

Related U.S. Application Data

[62] Division of application No. 09/056,947, Apr. 8, 1998, Pat. No. 5,937,705.

[51] Int. Cl.$^7$ .................................................. F16C 1/10
[52] U.S. Cl. ................................. 74/502.6; 74/501.5 R
[58] Field of Search ........................ 74/502.4, 502.6, 74/501.5 R

[56] References Cited

U.S. PATENT DOCUMENTS

| | | | |
|---|---|---|---|
| 4,225,261 | 9/1980 | Marx | 403/122 |
| 4,504,167 | 3/1985 | Nakanishi | 403/325 |
| 5,156,064 | 10/1992 | Truman | 74/502.6 X |
| 5,575,180 | 11/1996 | Simon | 74/502.4 |
| 5,584,212 | 12/1996 | Wild | 74/502.6 |
| 5,682,797 | 11/1997 | Kelley et al. | 74/502.4 |
| 5,683,117 | 11/1997 | Corbett et al. | 285/24 |

FOREIGN PATENT DOCUMENTS 0 589 550 A1  3/1994  European Pat. Off. .

OTHER PUBLICATIONS

International Search Report from PCT/US99/07341 (International application corresponding to USSN 09/056,947, of which application Serial No. 09/300,896 herein is a divisional) dated Jul. 20, 1999.

Primary Examiner—Mary Ann Battista
Attorney, Agent, or Firm—Renner, Kenner, Greive, Bobak, Taylor & Weber

[57] ABSTRACT

A push-pull control cable assembly having a casing of a predetermined length with a core slidably received therein. A push-through-to-lock anchor fitting is provided at each end of the casing. A fixedly positioned terminal end fitting is secured to the core through an end rod. The fixedly positioned terminal end fitting employs a receiver with a blind bore. A slot in the receiver transversely intersects the blind bore, and a locking tab is received in the slot to be selectively slidable between first and second positions. The locking tab has an aperture. The aperture permits a connecting spur to be inserted therein and withdrawn therefrom when the locking tab is in its first position. The aperture engages the connecting spur to preclude withdrawal thereof when the locking tab is in its second position. A selectively positionable terminal end fitting is secured to the core through another end rod. The selectively positionable terminal end fitting has a housing. A concave race extends circumferentially within the housing, and ports open transversely through the concave race. An annular connecting ring is received within the concave race for limited circumferential and transverse rotation relative to the concave race. The connecting ring receives a grooved end rod extending through the ports. An adjusting member having a plurality of dogs is removably secured within the connecting ring. The dogs selectively engage the grooved end rod to preclude removal of the end rod from the connecting ring.

10 Claims, 11 Drawing Sheets

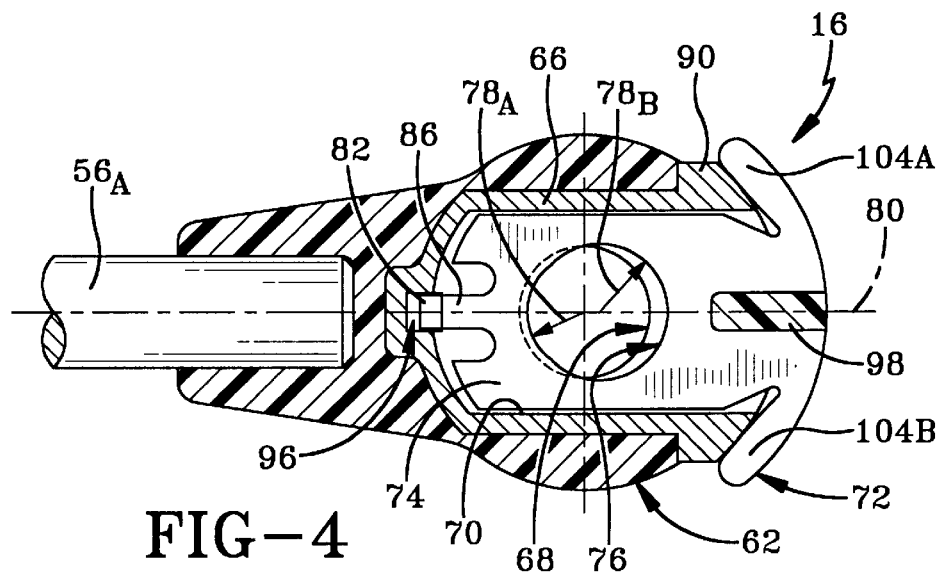
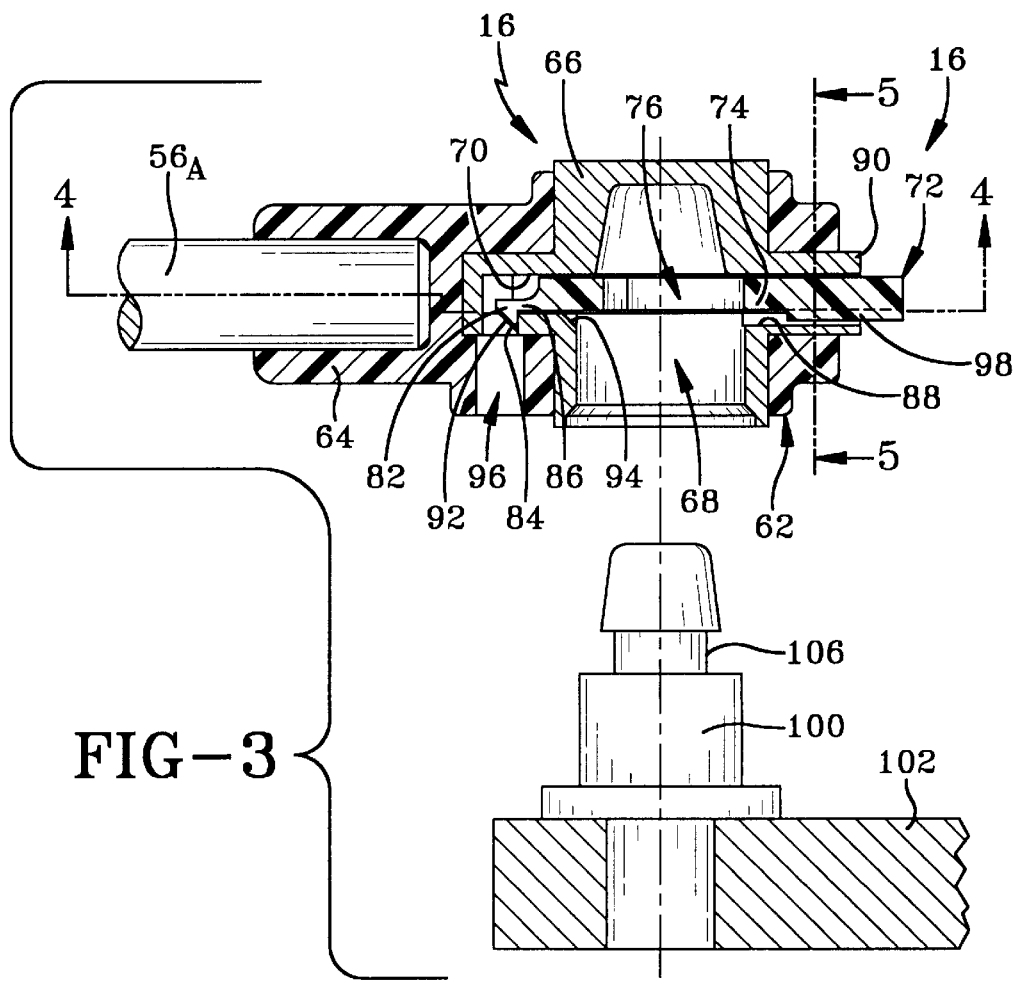

PUSH-PULL CONTROL CABLE ASSEMBLY WITH QUICK-RELEASE TERMINAL FITTINGS THEREFOR

RELATED APPLICATION

The subject application is a divisional application of U.S. patent application Ser. No. 09/056,947, which was filed on Apr. 8, 1998, and which issued as U.S. Pat. No. 5,937,705 on Aug. 17, 1999.

TECHNICAL FIELD

The present invention relates generally to push-pull control cables. More particularly, the present invention relates to terminal end fittings for the cores of push-pull control cables. Specifically, the present invention relates to a selectively positionable terminal end fitting (as well a fixedly positioned terminal end fitting) by which one or the other end of the core of a push-pull control cable can be detachable secured to an operator-control (i.e.: input) device or a controlled (i.e.: output) device located remotely of the operator-control input device.

BACKGROUND OF THE INVENTION

Assemblies used to translate motion in a push-pull manner from a remote input, or operator-control, device to an output, or controlled, device include a known variety of cables and linear-to-rotary mechanisms used in automotive, truck, aircraft, recreational and marine environments. These motion transferring mechanisms are often necessary because the most desired location from which to operate the controlled output device is often not adjacent thereto but rather from a remotely located operator-control, or input, device.

More precisely to associate push-pull control devices to a typical installation, an engine or transmission is often located in a confined compartment removed from the area occupied by the operator and any passengers. For instance, the engine and transmission of a vehicle are generally confined under a hood in a compartment separated by a fire wall from the operator/passenger compartment from which the operator remotely controls the engine and transmission. Additionally, the engine, and transmission, are customarily connected to the vehicle frame through flexible mounts, while the operator-control device is generally mounted either directly, or by rigid mounting devices, to the frame. Thus, from installation-to-installation a considerable amount of accommodating adjustment may be necessary to effect the desired connection between the controlled output device and a remotely located operator-control input device.

Motion transmitting arrangements that typically operate in a push-pull manner have been employed for years as cable controls for automatic transmissions, parking brakes, clutches, cruise control devices and shifting devices where such assemblies are not only remote from the operator-control device but also separated such that the interconnection therebetween must follow a non-linear path.

Known motion transmitting arrangements uitilize one or more cables that are axially movable in a push-pull manner for operatively connecting the remote operator-control device to an arm, or similar mechanism, that adjusts, shifts, or otherwise acts on the remote controlled device. One example that exemplifies a typical installation comprises the operation of a transmission assembly where the motion transmitting arrangement is attached to an operator-control gear selecting device at one end of the motion transmitting arrangement and a lever arm presented from the transmission shifting mechanism at the other end. A second example would be a carburetor/throttle assembly where a motion transmitting arrangement is attached to an operator-control accelerator at one end thereof and to a throttle actuating mechanism in a carburetor at the other end.

Push-pull control cables to effect the desired interconnection between an operator-control device and a remotely located controlled device are, generally, well known to the art as devices capable of transmitting mechanical motion in either direction by virtue of a cable core when at least the ends of the cable casing are satisfactorily clamped in position.

Although the prior art knows many constructions for push-pull cable casings, one of the most suitable constructions to assure the greatest flexibility and efficiency comprises a plurality of wires laid contiguously in a long pitch helix around the outer periphery of a plastic tube. The helically arranged wires of the casing are maintained in their proper position solely by a plastic cover in the smaller cables and by a reinforcing spread helix of wire, or flat metallic ribbons, in conjunction with the plastic cover in larger cables.

In the above described construction for cable casings the plastic tube which comprises the innermost element not only acts as a bearing for the core of the cable that is slidable within the casing but also acts to protect the casing wires from any natural elements gaining access to the interior of the tube. A plastic outer cover similarly protects the wires as it maintain them in their cylindrically disposed, helical grouping around the inner tube.

Anchor fittings are provided at each end of the casing to provide means for securing the control cable casing in operative position, and a terminal end fitting is also provided at each end of the core to secure the core, respectively, to an operator-control input device and a remotely controlled, output device.

Historically, the ends of the push-pull control cable casing were secured in a fixed location by a clamping device held in place by a plurality of nuts and bolts (or screws) and lock washers. Each end of the core within the casing was connected to an end rod. The other end of one end rod was connected to the operator-control input device—and this was normally effected by a fixedly positioned nut and bolt connection. The other end rod of the second end rod was connected to the controlled output device by a selectively positionable arrangement that typically comprised a clevis that was selectively positionable along the second end rod and secured in the desired location by a lock nut. In turn, the clevis was secured to the operating arm on the controlled output device by a well known pin, washer and cotter pin arrangement.

The aforesaid historic arrangement of securing the push-pull cable core to both the operator-control input device and the controlled output device was replaced by snap-on, snap-off connectors. The snap-on, snap-off connectors utilized to date in the automotive industry, for example, have required virtually as much force to snap-on as to snap-off. In fact, the best known prior art connector acceptable to the automotive industry required 85 Newtons to effect a snap-on and 90 Newtons to effect a snap-off. Other industry standards require that the connector withstand 50,000 cycles under loads of 90 Newtons in a tension/compression testing. Moreover, the connector must also withstand a minimum of 450 Newtons before separation of the terminal end fitting from the end rod occurs.

Industries using push-pull control cables have not been able to achieve a significantly low snap-on force while maintaining the required minimum snap-off force. Nor has it been easy to achieve the desired wear life over the required number of operating cycles—particularly when being subjected to the range of temperatures to which automotive installations would be exposed in actual operation. In addition, the best known prior art arrangements have been limited to three snap-on and snap-off cycles. It must also be appreciated that the structural differences from installation-to-installation virtually assures that it will seldom occur that the axis of the end rod can be perpendicularly aligned with the rotational axis of the operating arm on the controlled output device. As is well known to those skilled in the appropriate art, the prior known terminal end fittings do not accommodate the desired ease of operation when subjected to such misalignment.

SUMMARY OF THE INVENTION

It is, therefore, a primary object of the present invention to provide a novel push-pull control cable assembly wherein the terminal end fittings will provide a significantly increased, and therefore improved, minimum snap-off force over the required number of operational cycles—even when subjected to grueling temperature ranges.

It is another object of the present invention to provide a novel push-pull control cable assembly, as above, wherein the terminal end fittings will provide a significantly reduced snap-on force over the required number of operational cycles—again, even when subjected to grueling temperature ranges.

It is a further object of the present invention to provide a novel push-pull control cable assembly, as above, wherein at least that terminal end fitting associated with the remote controlled output device will readily accommodate misalignments typically encountered between the axis of the end rod with respect to the rotational axis of the operating arm for the controlled output device to which it is operatively connected.

It is still another object of the present invention to provide a novel push-pull control cable assembly, as above, wherein the terminal end fittings permit a virtually unlimited number of assembly and disassembly cycles.

It is yet another object of the present invention to provide novel push-pull control cable assembly, as above, which affords the foregoing advantages and at the same time effectively isolates noise and vibration from being transferred through the push-pull control cable assembly from the remote controlled output device to the operator-control input device.

It is an even further object of the present invention to provide a novel push-pull control cable assembly, as above, wherein that terminal end fitting which provides selective positioning between the core of the push-pull control cable and the controlled device can be assembled from either side of the operating arm.

These and other objects of the invention, as well as the advantages thereof over existing and prior art forms, which will be apparent in view of the following detailed specification, are accomplished by means hereinafter described and claimed.

In general, a push-pull control cable assembly embodying the concepts of the present invention utilizes a casing having a predetermined length with a core slidably received in the casing. An anchor fitting is provided at each end of the casing, and each anchor fitting has a barrel portion and a socket portion. A swivel sleeve is mounted in each socket portion, and the swivel sleeve slidably receives an end rod that is secured to the push-pull cable core. Fixedly located supporting members—for engaging the anchor fitting on each end of the casing—are each penetrated by an aperture to receive one of the anchor fittings. The aforesaid apertures, which are generally in the nature of a bore or slot, are provided on each supporting member embracingly to engage the anchor fitting when the barrel portion thereof is insertably received through the aperture in the supporting means.

A fixedly positioned terminal end fitting is secured to one end rod. The fixedly positioned terminal end fitting employs a receiver, and a blind bore—which is disposed transversely with respect to the axis of the end rod to which the receiver is secured—is provided in the receiver. An axially disposed slot in the receiver intersects the transversely disposed blind bore, and a locking tab is received in the slot to be selectively slidable between a first and a second position. The locking tab is penetrated by an aperture disposed transversely of the locking tab and axially with respect to the blind bore. The aperture permits a connecting spur presented from one or the other of the operator-control input, or the remotely controlled output, devices to be inserted in and withdrawn from the blind bore through the aperture when the locking tab is in its first position. The aperture engages the connecting spur to preclude withdrawal thereof from the blind bore when the locking tab is in its second position. The locking tab can be manually displaced from the second to the first position.

A selectively positionable terminal end fitting is secured to the other end rod. The selectively positionable terminal end fitting has a housing with an interior surface. A concave race extends circumferentially of the interior surface of the housing, and ports open transversely through the housing to intersect the concave race. An annular connecting ring is disposed transversely within the housing to be received within the concave race for limited circumferential and transverse rotation relative to the concave race. A bore transversely penetrates the connecting ring to receive the end rod which is insertably received through the ports. An adjusting member is removably secured axially within the connecting ring, and a plurality of dogs are mounted in the adjusting member operatively to engage the end rod in order selectively to preclude removal of the end rod from the transverse bore in the connecting ring.

To acquaint persons skilled in the arts most closely related to the present invention, one preferred embodiment of a push-pull control cable fitted with novel and unique end fittings that illustrate a best mode now contemplated for putting the invention into practice is described herein by, and with reference to, the annexed drawings that form a part of the specification. The exemplary push-pull control cable, as well as optional variations for at least one of the terminal end fittings for the core are described in detail without attempting to show all of the various forms and modification in which the invention might be embodied. As such, the embodiments shown and described herein are illustrative, and as will become apparent to those skilled in these arts can be modified in numerous ways within the scope and spirit of the invention—the invention being measured by the appended claims and not by the details of the specification.

BRIEF DESCRIPTION OF THE DRAWINGS

FIG. 3 is an enlarged, longitudinal section taken substantially along line 3—3 of FIG. 1 to depict the novel and unique, fixedly positioned, quick-release terminal end fitting shown in FIG. 2—said terminal end fitting attached to an end rod that is secured to the core of a push-pull control cable;

FIG. 4 is an enlarged, longitudinally vertical cross section taken substantially along line 4—4 of FIG. 1 as well as line 4—4 of FIG. 3 to depict the interaction between the locking tab and the receiver of the novel and unique, fixedly positioned, quick-release terminal end fitting;

DESCRIPTION OF AN EXEMPLARY EMBODIMENT

Preview of Overall Push-pull Cable Assembly

Figure 1:
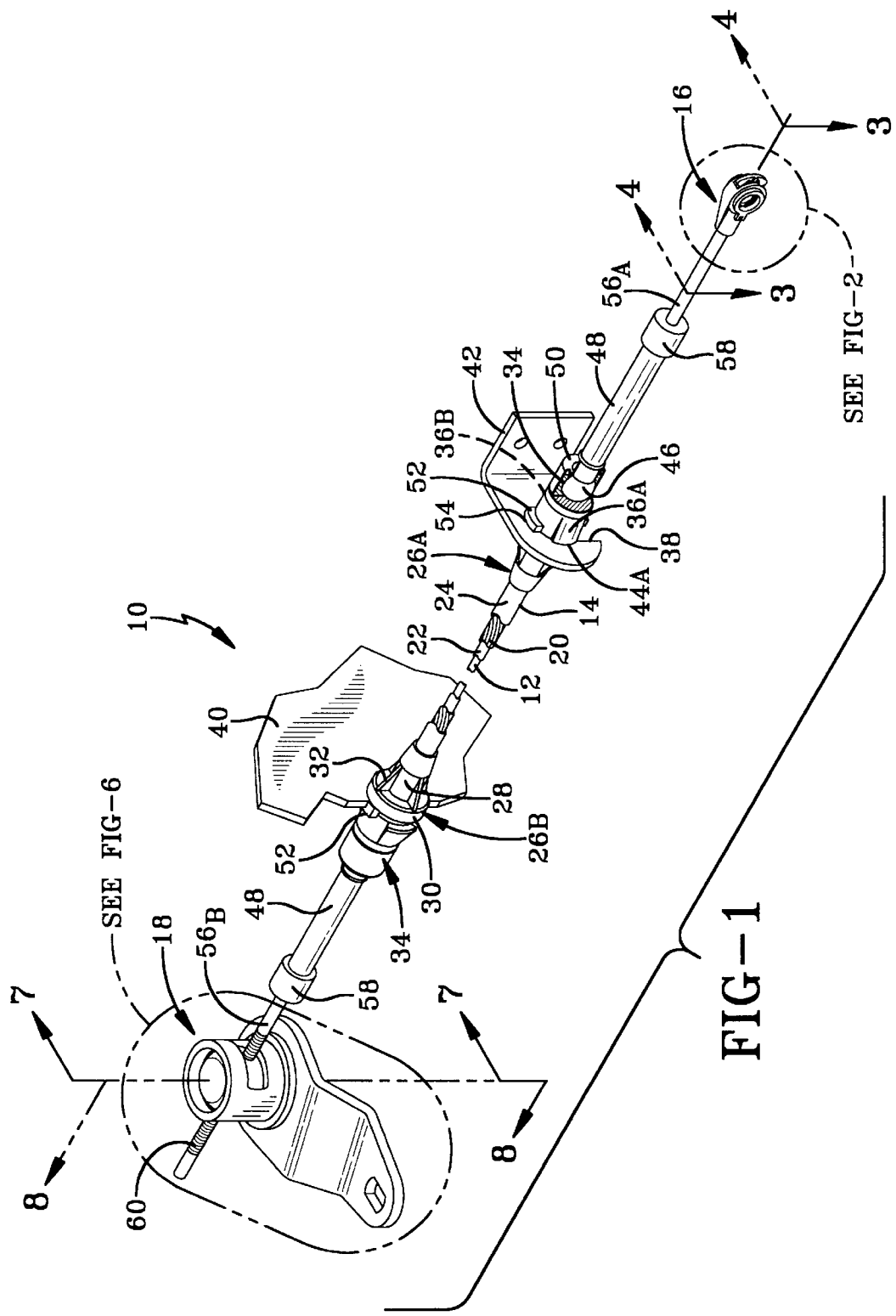
FIG. 1 is a perspective view, partially in section and partially broken away, of a push-pull control cable having a core slidably received within a casing—each end of the casing is provided with a push-through-to-lock anchor fitting, one end of the core provide with a selectively positionable, quick-release terminal end fitting and the other end of the core provided with a fixedly positioned, quick-release terminal end fitting.

Referring more particularly to the drawings, a push-pull control cable assembly is identified generally by the numeral 10. The push-pull cable assembly 10 includes a core 12 and a casing 14 in which the core 12 is reciprocally slidable. One end of the core 12 is operatively connected to a fixedly positioned, quick-release terminal end fitting 16, and the other end of the core 12 is operatively connected to a selectively positionable, quick-release terminal end fitting 18. Both the terminal end fittings 16 and 18 will be hereinafter more fully described.

The prior art knows many casing constructions, and one form of a casing 14 is depicted herein that comprises a plurality of wires 20 contiguously laid in the form of a relatively long pitch helical coil about the radially outer surface of an inner, flexible tube 22 which extends the full length of the casing 14. For example, the casing 14 may employ twelve 1.19 mm oil-tempered wires helically wound about a flexible nylon tube, or sheath. An outer, flexible cover 24 (that may typically be a nylon polymer) encases the helically coiled wires 20 and extends along the entire casing 14 generally to within a short distance from the end of the wires 20.

A typical high efficiency push-pull control cable employed to operate a vehicular transmission may utilize seven twisted wires encapsulated in a Teflon liner to comprise the core 12, and such a core need only be 2.2 mm in diameter effectively to transmit the forces required to operate a vehicular transmission.

An anchor fitting 26 may be employed at each end of the casing 14 by which to secure the ends of the casing 14 against at least longitudinal movement. A typical anchor fitting 26 may have a barrel portion 28 that is disposed to circumscribe the wires 20 and the cover 24 of the casing 14. So positioned, the barrel portion 28 may be fixedly secured to the casing 14 as by being integrally molded thereto. A radially extending locating flange 30 circumscribes the barrel portion 28 and may be reinforced by axially extending buttress flanges 32 that may be integrally formed with the barrel portion 28 and the locating flange 30.

A socket 34 is provided at that end of the fitting 26 opposite the barrel portion 28. At least two locking tongues 36 extend from the exterior of the socket 34 toward the locating flange 30. The locking tongues 36A and 36B will be displaced radially inwardly about their connection to the exterior of the socket 34 as the socket 34 is inserted through an aperture 38 of a supporting member—such as the fire wall 40 displayed in association with one end of the casing 14 or a mounting bracket 42 displayed in association with the other end of the casing 14—and snap radially outwardly to secure the fire wall 40 (or the mounting bracket 42) between the locating flange 30 and the engaging ends 44 of the locking tongues 36.

As may be appreciated from the preceding paragraph, in the detailed description which follows a particular structural member, component or arrangement may be employed at more than one location. When referring generally to that type of structural member, component or arrangement a common numerical designation shall be employed. However, when one of the structural members, components or arrangements so identified is to be individually designated it shall be referenced by virtue of a letter suffix employed in combination with the numerical designation employed for general identification of that structural member, component or arrangement. Thus, there are at least two locking tongues which are generally identified by the numeral 36, but the specific, individual locking tongues are, therefore, identified as 36A and 36B in the specification and on the drawings. This same suffix convention shall be employed throughout the specification.

A spherical ball arrangement 46 on one end of a swivel sleeve 48 is received within the socket 34 to permit a desired range of motion to the swivel sleeve 48, and a flexible sealing boot 50 is connected between the exterior of the socket 34 and the exterior of the swivel sleeve 48. If desired, an orienting stud 52 may extend radially outwardly from the socket 34 adjacent the locating flange 30 to be received within a corresponding orienting notch 54 in the supporting member, but for most installations orientation of the casing 14 is not required, and the orienting stud 52 may be eliminated.

An end rod 56 is reciprocally slidable within the swivel sleeve 48, and the core 12 is secured to the end rod 56 within the swivel sleeve 48. A rod wiper-scraping seal 58 may be operatively positioned on the outer end portion of the swivel sleeve 48. Exteriorly of the swivel sleeve 48 the end rod $56_A$ need merely be permanently secured to the end fitting 16. Conversely, the end rod $56_B$ may be provided with a plurality of longitudinally spaced, grooves 60 which interact with the terminal fitting 18 in order to provide the desired selective positioning thereof along the end rod $56_B$.

As may be appreciated from the preceding paragraph, closely related, but modestly different, structural members, components or arrangements will generally be identified by a common numerical designation, but the variations shall be distinguished by a letter subscript used in combination with the number. Thus, the end rods are generally identified by the number 56, but the individual, modestly different, but closely related, end rods are identified with the alphanumeric designations $56_A$ and $56_B$. This alpha-numeric subscript convention shall also be employed throughout the specification.

Both end rods $56_A$ and $56_B$ should be closely fitted within the interior of the swivel sleeves 48 not only to guide the end rods $56_A$ and $56_B$ but also to prevent excess deflection of that portion of the cable core 12 disposed within the swivel sleeves 48 when the core 12 is subjected to compressive loading.

Fixedly Positioned Terminal End Fitting

With reference to FIGS. 2–5, the terminal end fitting 16 provides a quick-release configuration that is particularly adapted for use in conjunction with the operator-control input device where the terminal end fitting 16 may be fixedly positioned with respect to the end rod $56_A$ and thus the axial movement of the core 12 within the casing 14. The terminal end fitting 16 has a plastic sheath 62 that may be permanently secured to the outer end portion of the end rod $56_A$. As such, the sheath 62 has an anchoring extension 64 that receives the outer end portion of the end rod $56_A$ and is permanently affixed thereto. A receiver 66 (FIGS. 3 and 4) in the nature of a metallic insert is preferably encapsulated within the plastic sheath 62, and the receiver 66 has a blind bore 68 oriented transversely of the end rod $56_A$. The receiver is also provided with a longitudinally oriented slot 70 within which a locking tab 72 is received for selective longitudinal displacement.

The locking tab 72 has a flat generally flat body portion 74 that is penetrated by an aperture 76 having first and second radii $78_A$ and $78_B$, for a purpose more fully hereinafter described. The radii $78_A$ and $78_B$ are disposed along, or parallel to, the longitudinal axis 80 of the body portion 74—which may, as shown, be coincident with the longitudinal axis of the end rod $56_A$. The axially inner portion of the aperture 76 is defined by the first radius $78_A$ which is of a lesser dimension than the second radius $78_B$, which defines the axially outer portion of the aperture 76.

Figure 2:
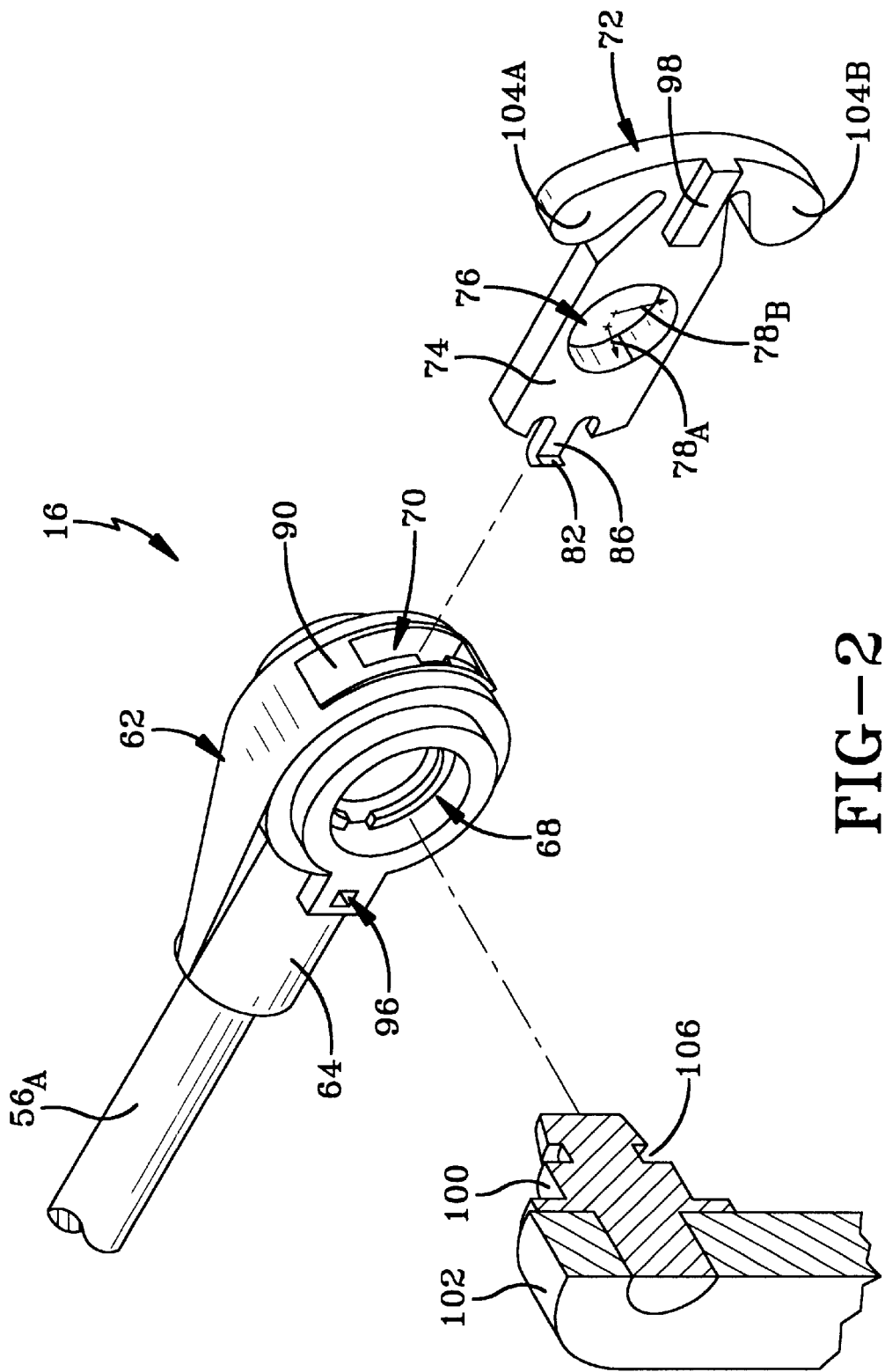
FIG. 2 is an enlarged, exploded perspective of a fixedly positioned, quick-release terminal end fitting taken substantially within that area of FIG. 1 outlined by the chain-line circle that is designated "SEE FIG. 2"—said end fitting adapted to receive a spur presented from a force transfer arm, said conjoined spur and transfer arm being represented in longitudinal section.
Figure 5:
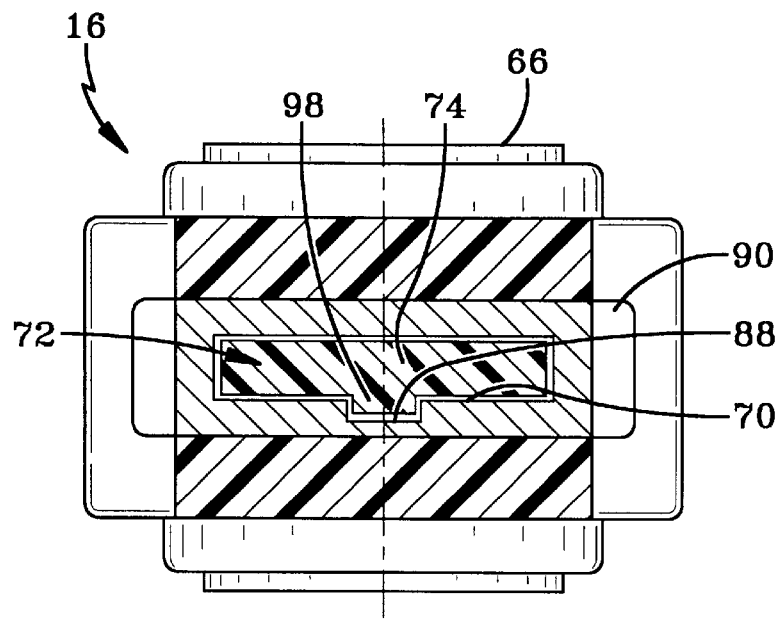
FIG. 5 is a cross section taken substantially along line 5—5 of FIG. 3.

At the axially innermost extent of the body portion 74 a pawl 82 extends outwardly from the body portion 74 to engage a blocking surface 84 on the receiver 66. As best seen in FIGS. 2, 3 and 4, the pawl 82 may be located on the end of a resilient arm 86 which biases the pawl 82 into engagement with the blocking surface 84 after the locking tab 72 has been is inserted sufficiently within the longitudinal slot 70 in the receiver 66. A notch 88 (FIG. 5) is located perpendicularly with respect to the slot 70 and extends longitudinally from the blind bore 68, through the receiver 66 and a hereinafter more fully described reactive rib 90 on the exterior of the receiver 66 to permit the pawl 82 to enter the slot 70.

The pawl 82 is provided with an inclined camming surface 92 which passes through slot 88 and engages the beveled edge 94 at the juncture of the slot 70 and the blind bore 68 in the receiver 66 to displace the arm 86 and allow the pawl 82 to travel along that portion of the slot 70 which extends beyond the blind bore 68 and then snap behind the blocking surface 84 to retain the locking tab 72 within the slot 70. An access opening 96 extends outwardly through the receiver 66 to permit one to insert a tool, such as a center punch (not shown), to assist in displacing the pawl 82 from the blocking surface 84 and thus permit the locking tab 72 to be readily withdrawn from the slot 70.

The axially outer portion of the locking tab 72 is preferably provided with an aligning rib 98 which is received within the notch 88 to maintain alignment of the locking tab 72 with the slot 70, This alignment is highly desirable for the now to be described axial displacement of the locking tab 72 which is utilized to engage, and disengage, the locking tab 72 from the spur 100 presented from the operator-control input device to interact with the terminal end fitting 16. It is, therefore, the spur 100 by which the force transfer arm 102 on the operator-control input device is selectively connected to the terminal end fitting 16. It will be observed from FIGS. 2 and 3 that the spur 100 conforms to the configuration of the blind bore 68 in the receiver 66 to permit the locking tab 72 releasably to engage the spur 100.

The axially outer extremity of the flat body portion 74 terminates in laterally extending biasing wings 104A and 104B which engage the reactive rib 90 presented from the receiver 66 of the terminal end fitting 16. When the pawl 82 is positioned in engagement with the blocking surface 84 the biasing wings 104 engage the reactive boss 90 which projects outwardly from the receiver 66 at least along the lateral edges of the receiving slot 70. In fact, the biasing wings 104 impart a modicum of axial force which maintains the pawl 82 in locking engagement with the blocking surface 84.

So positioned by the biasing action of the wings 104, that portion of the aperture 76 defined by the shorter radius $78_A$ engages an annular recess 106 in the spur 100 to retain the spur 100 within the blind bore 68. However, when one applies an axial force to the outer end portion of the locking tab 72 the wings 104 flex to permit the locking tab 72 to move axially inwardly so as to align that portion of the aperture 76 defined by the larger radius $76_B$ with the blind bore 68, thereby withdrawing the blocking connection of the aperture 76 defined by the smaller radius $78_A$ from recess 106 and permitting the spur 100 to be withdrawn from the blind bore 68.

Selectively Positionable Terminal End Fitting

Figure 6:
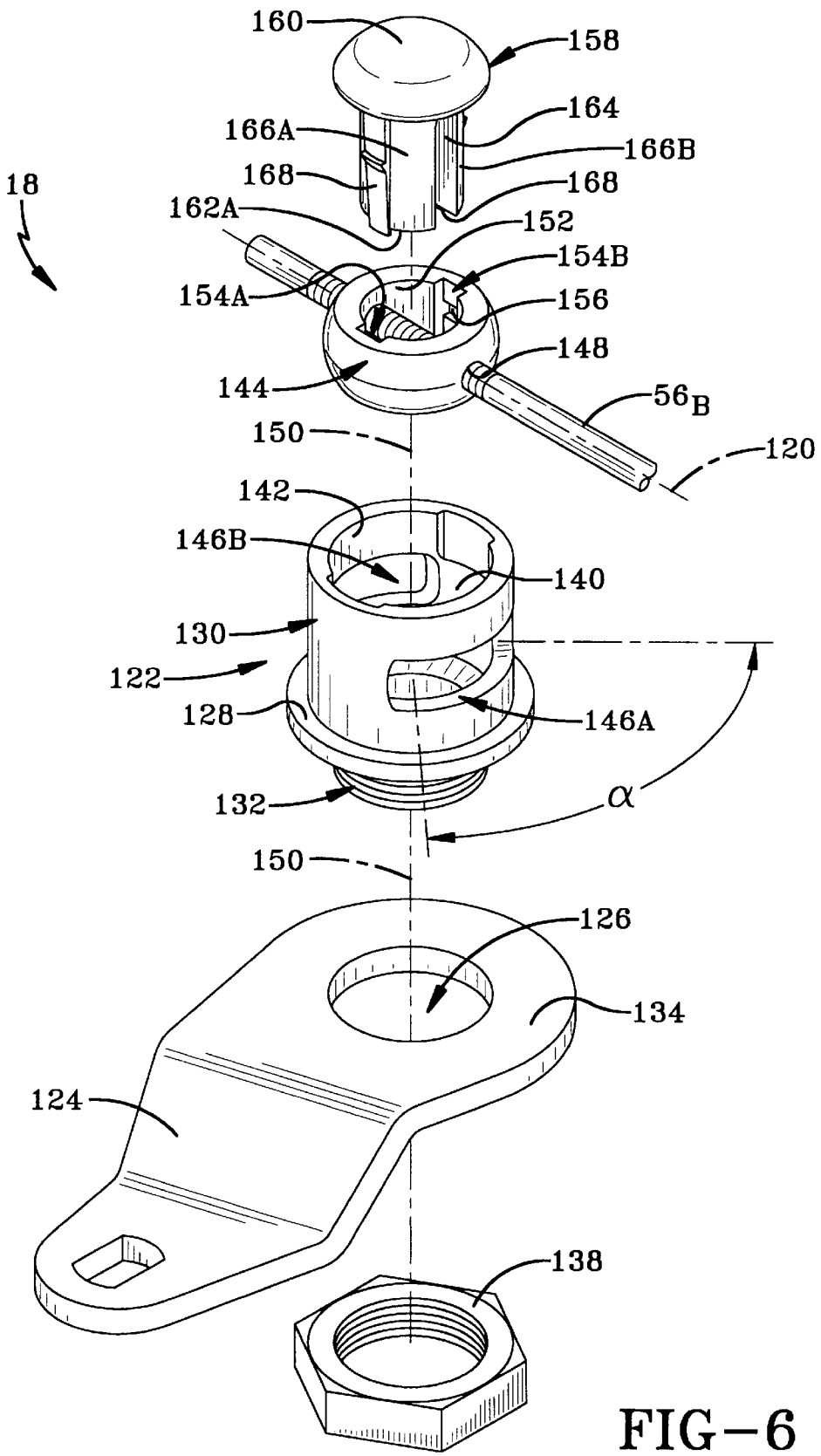
FIG. 6 is an enlarged, exploded perspective of a selectively positionable, quick-release terminal end fitting taken substantially within that area of FIG. 1 outlined by the chain-line ellipse that is designated "SEE FIG. 6"
Figure 7:
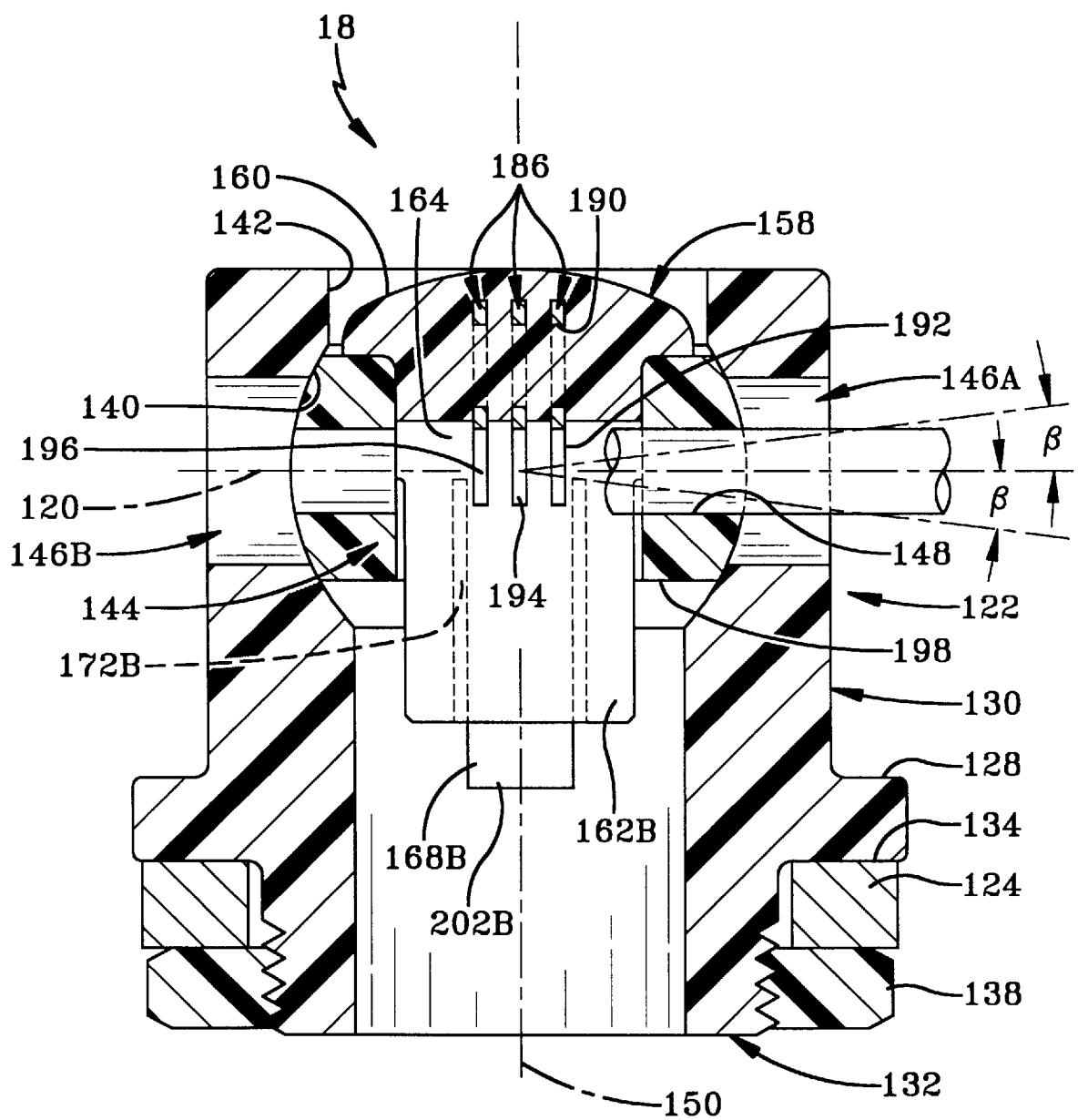
FIG. 7 is an enlarged, vertical section taken substantially along line 7—7 of FIG. 1 to depict the interaction of the structural components of the novel and unique, selectively positionable, quick-release terminal connector also shown in FIG. 6.
Figure 8:
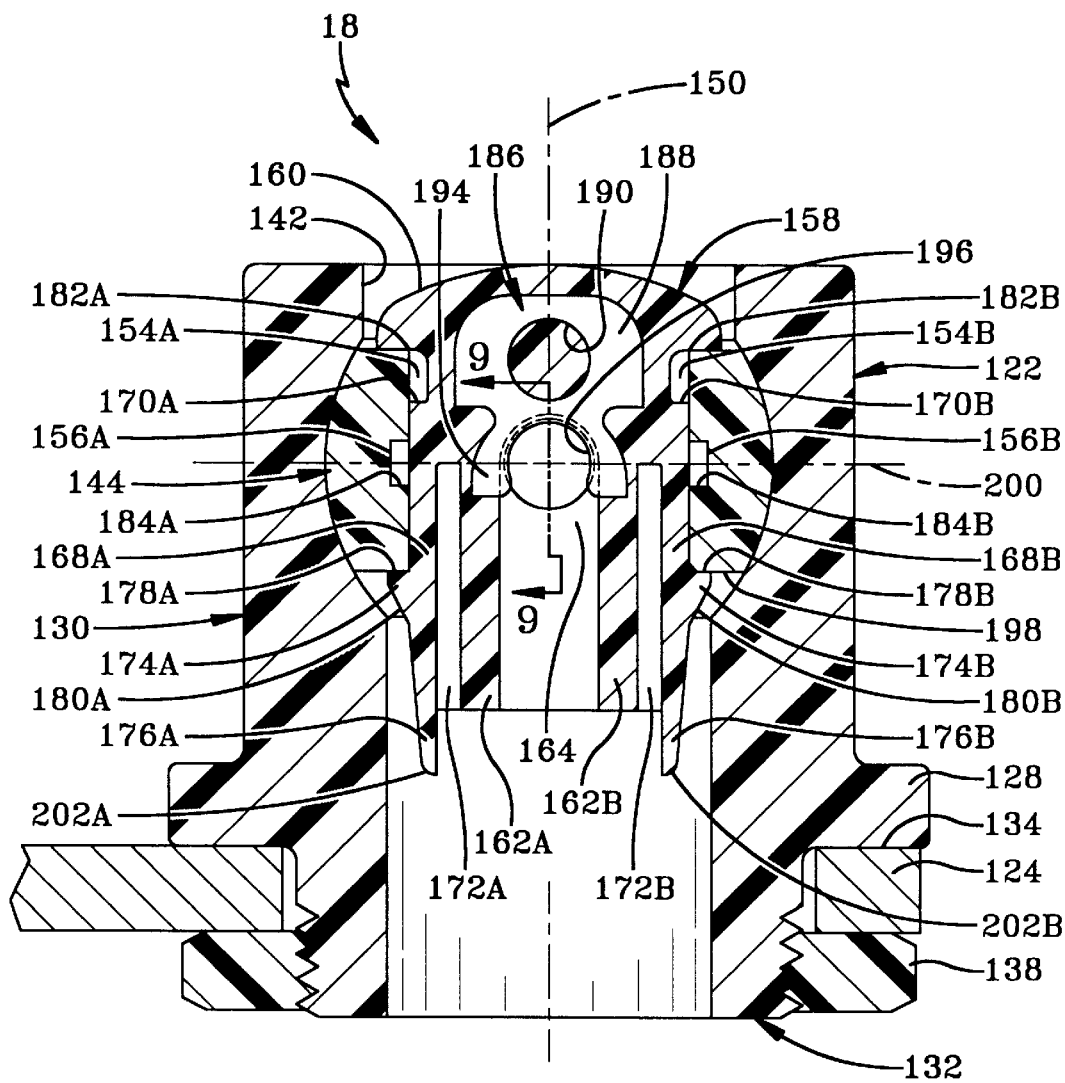
FIG. 8 is an enlarged, vertical section taken substantially along line 8—8 of FIG. 1 also to depict the interaction of the structural components of the novel and unique, selectively positionable, quick-release terminal connector depicted in FIGS. 6 and 7.
Figure 14:
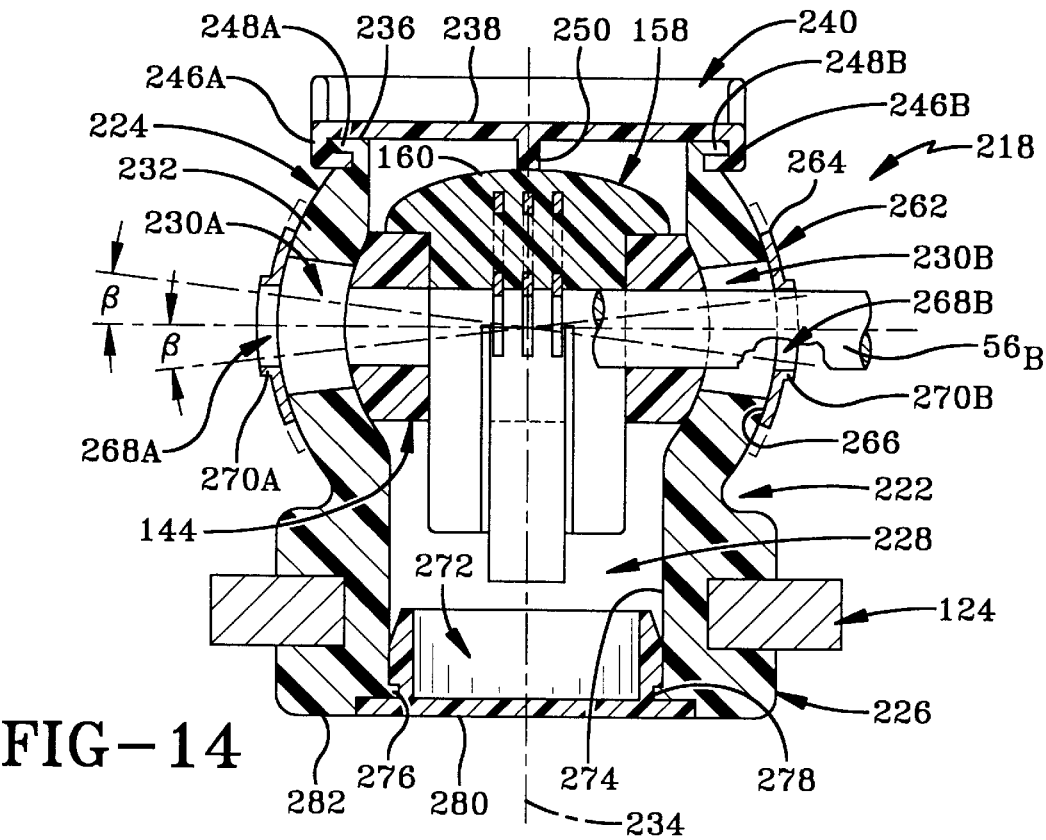
FIG. 14 is a cross section taken substantially along line 14—14 of FIG. 13; and, FIG. 15 is a cross section taken substantially along line 15—15 of FIG. 13.
Figure 15:
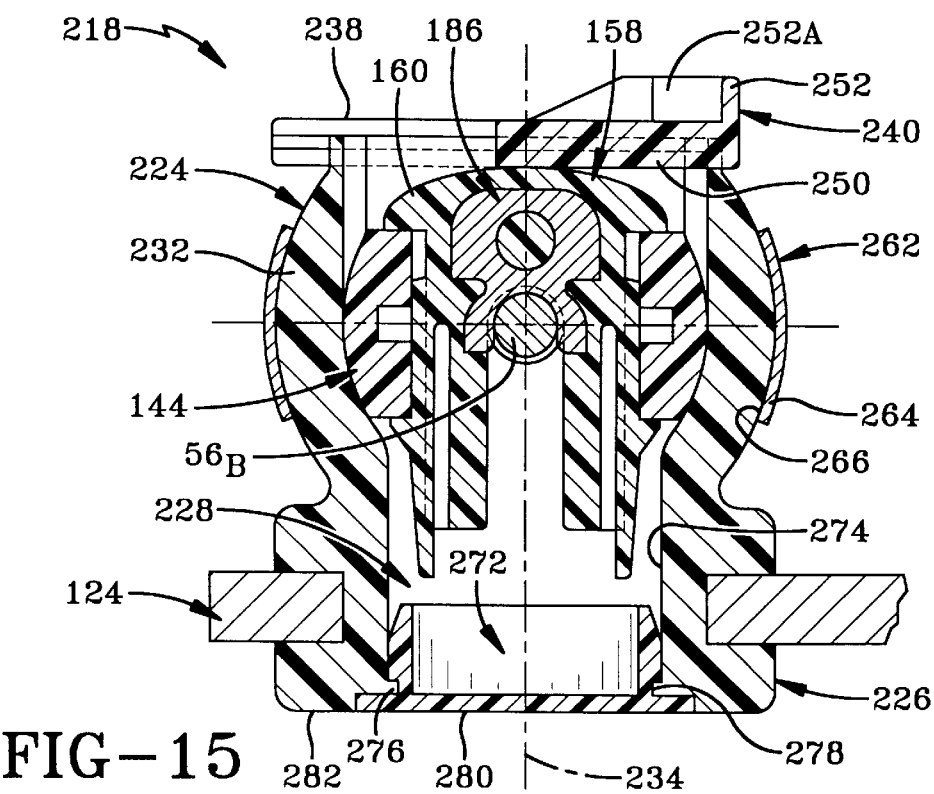

With reference to FIGS. 6–8, the terminal end fitting 18 not only provides a quick-release configuration but also one which permits selectively positioning the terminal end fitting 18 along the axis 120 of the end rod 56$_B$. As such, the end fitting 18 has a housing 122 (which, in this embodiment, is annular) that may be secured to the operating arm 124 of a controlled output device, as by the aperture 126 in the operating arm 124. The annular housing 122 is circumscribed by a radially extending securing flange 128 which also generally divides the annular housing 122 into an interacting portion 130 and a mounting portion 132. The securing flange 128 engages the surface 134 of the operating arm 124 when the mounting portion 132 is insertably received within the circular receiving aperture 126 in the operating arm 124. The mounting portion 132 may be threaded to receive a locking nut 138 that can be tightened rigidly to secure the annular housing 122 to the operating arm 124. An equally applicable connection to the operating arm 124 is hereinafter defined and described in conjunction with FIGS. 12, 14 and 15.

A concave race 140 extends circumferentially about the interior surface 142 of the interacting portion 130 rotatably to receive a toroidal connecting ring 144. A pair of diametrically opposed ports 146A and 146B penetrate the interacting portion 130 of the housing 122, and said ports 146 are, along their circumferential extent, congruent with the concave race 140. The connecting ring 144 is penetrated by a transverse bore 148 to receive the end rod 56$_B$. As such, the end rod 56$_B$ is permitted: 1) to rotate through the circumferential angular range that is defined by the circumferential extent of the opposed ports 146; and 2) to swivel, in unison with the connecting ring 144, within those planes defined by the axial extent of the ports 146. The circumferential angular range typically provides about 68° of rotation (which is designated as angle α on FIG. 6), and the axial extent of the ports 146 typically permits the end rod 56$_B$ to accommodate up to about plus or minus seven degrees (±7°)—which is designated as angle β on FIG. 7—of misalignment between the axis 120 of end rod 56$_B$ and the axis 150 of the annular housing 122. It should be noted that this misalignment constitutes the angular disparity by which the axis 120 of the end rod 56$_B$ fails perpendicularly to intersect the axis 122 of the annular housing 150.

The inner wall 152 of the toroidal connecting ring 144 presents two opposed, longitudinally extending channels 154A and 154B, and the medial portion of each channel 154 is interrupted by transverse recess 156, the purpose of which will be hereinafter more fully explained.

An adjusting member 158 is operatively received within the interior of the connecting ring 144. The adjusting member 158 has a head portion 160 from which two arms 162 extend axially to define a U-shaped saddle 164 therebetween. Each arm 162 has an axially extending, transversely arcuate outer surface 166. The outer surfaces 166A and 166B on the respective arms 162A and 162B engage the cylindrical inner wall 152 of the toroidal connecting ring 144 to facilitate selective axial translation of the arms 162 within the connecting ring 144.

As best seen in FIG. 8, a detent key 168 extends axially along each arm 162. That end 170A and 170B of each respective detent key 168A and 168B closest to the head portion 160 may be integrally connected to the respective arm 162A and 162B, and the remainder of each detent key 168A and 168B is disposed to overlie a longitudinally extending groove, or way, 172A and 172B, respectively, that is recessed radially inwardly of the outer surface 166A and 166B on each arm 162A and 162B. As such, the detent keys 168A and 168B may flex about their respective ends 170A and 170B to swing in and out of the respective grooves, or ways, 172A and 172B. A detent pawl 174A and 174B is provided medially of each respective detent key 168A and 168B on the radially outer surface 176A and 176B thereof. That side of each detent pawl 174 facing the head portion 160 of the adjusting member 158 defines a catch surface 178 that may be disposed substantially at a right angle with respect to the corresponding detent key 168A and 168B, and the opposite face is inclined to present a camming surface 180.

With the arms 162A and 162B on the adjusting member 158 being aligned with the respective longitudinal channels 154A and 154B (FIG. 6) in the connecting ring 144 the application of axial pressure to the head portion 160 of the adjusting member 158 will force the camming surfaces 180 to engage the edges 182A and 182B, respectively, of the channels 154A and 154B causing the detent keys 168A and 168B to swing into the grooves, or ways, 172A and 172B in order to permit the pawls 174A and 174B to enter the channels 154A and 154B and slide axially therealong until the pawls 174A and 174B enter the transverse recesses 156A and 156B, respectively, by virtue of the biasing action of the detent keys 168A and 168B. With pawls 174 thus received in the transverse recesses 156, the adjusting member 158 is disposed in what shall be designated as the "shipping position" which shall be hereinafter more fully described in conjunction with the alternative configuration depicted in FIGS. 11 and 12.

The continued application of axial pressure against the head portion 160 of the adjusting member 158 when the adjusting member 158 is in the shipping position, will bring the inclined camming surfaces 180A and 180B on the detent pawls 174A and 174B into engagement with one side wall 184A and 184B of the transverse recesses 156A and 156B in the channels 154A and 154B. This action also causes the detent keys 168A and 168B to swing into the grooves, or ways, 172A and 172B in order to permit the pawls 174A and 174B to re-enter the channels 154A and 154B and slide axially therealong—thereby permitting the adjusting member 158 to continue its axial movement until it reaches the "anchor position." That is, the adjusting member 158 will operatively engage the end rod 56B to preclude axial movement of the end rod 56B along its longitudinal axis 120 or transversely with respect to the terminal fitting 18 when the adjusting member 158 is in the anchor position.

In the anchor position a plurality of connecting dogs 186 (such as the three depicted in FIGS. 7 and 8) supported by the adjusting member 158 operatively engage a like number of the annular grooves 60 on the end rod 56$_B$ to preclude movement of the end rod 56$_B$ axially of itself, or transversely with respect to the terminal and fitting 18. At this point it should be noted that whereas individual, axially spaced, annular grooves 60 are preferred, the connecting dogs 186 may be disposed to engage threads on the end rod 56$_B$ should one desire to use existing end rods adapted to receive the historically employed clevis.

With continued reference to FIGS. 7 and 8, the connecting dogs 186 may be metallic and may be molded in situ within the adjusting member 158 which may be a suitable plastic material. The tang portion 188 of each connecting dog 186 may be perforated, as by one or more openings 190 to permit the material from which the adjusting member 158 is molded to penetrate the tang portion 188 and thereby further secure each connecting dog 186 in the desired position within the adjusting member 158. The blade portion 192 of each connecting dog 186 extends into the U-shaped saddle 164 between the adjacent arms 162 of the adjusting member 158, and the outer edge 194 of 5 the blade portion 192 is provided with a semi-cylindrical notch 196 that is dimensioned to be received within the grooves 60 in the end rod $56_B$.

When the notch 196 is sufficiently seated—in semi-cylindrical congruity—within the grooves 60 to secure the end rod $56_B$ to the adjusting member 158, the catch surface 178 on each detent pawl 174 engages the rim 198 of the connecting ring 144 to secure the end rod $56_B$ to the connecting ring 144. This defines the anchor position of the adjusting member 158. With the end rod $56_B$ so secured to the connecting ring 144, the toroidal connecting ring 144 and the conjoined end rod $56_B$ will be able to rotate freely about the axis 150 of the terminal end fitting 18 through that circumferential range delimited by the circumferential span of the ports 146. Typically, each port 146 has a circumferential span of approximately 68° (represented as angle α in FIG. 6), and that rotational range is sufficient for most installations.

In addition, the connecting ring 14 and the conjoined end rod $56_B$ will be able swing about the transverse axis 200 of the connecting ring 144 that is disposed perpendicularly with respect to the axis 120 of the end rod $56_B$ in order to accommodate a plus or minus seven degrees (±7° represented as angle β on FIG. 7) of misalignment between the axes 120 and 150. This accommodation is effected by having the toroidal connecting ring 144 received within a race 140 with a transverse radius of curvature substantially equal to the exterior transverse radius of the outer surface 202 on the toroidal connecting ring 144. To obviate any uncertainty, the transverse radius of the exterior surface 202 of the toroidal connecting ring 144 is centered at the intersection of axes 120 and 150 to define an arc that falls within that plane which intersects those axes 120 and 150. The revolution of that arc about axis 150 generates the curved, outer surface 202.

It should also be observed that even though the drawings depict insertion of the adjusting member 158 from that end of the housing 122 comprising the interacting portion 130, there may be well be installations where access to that end of the housing may be restricted, or precluded. If so, and because the connecting ring 144 is fully symmetrical, one may insert the adjusting member 158 from that end of the housing 122 comprising the mounting portion 132. The terminal end fitting 18 operates equally well, and without any diminution of its functional operation, irrespective of whichever end of the housing 122 is chosen for insertion of the adjusting member 158.

Removal of the adjusting member 158, or even moving the adjusting member from the anchor position to the storage position may be facilitated by using a pair of tongs, long nose pliers or the like to engage the free ends 202A and 202B of the detent keys 168A and 168B and thereby pivot those detent keys into their respective grooves, or ways, 172A and 172B in order to free the catch surface 178 on each detent pawl 174 from either the rim 198 of the connecting ring 144 (to permit movement of the adjusting member 158 axially outwardly away from the anchor position) or allowing the detent pawls 174 to exit the respective transverse recesses 156 (to permit movement of the adjusting member 158 axially outwardly away from the shipping position).

Optional Variations of the Selectively Positionable Terminal End Fitting

Figure 9:
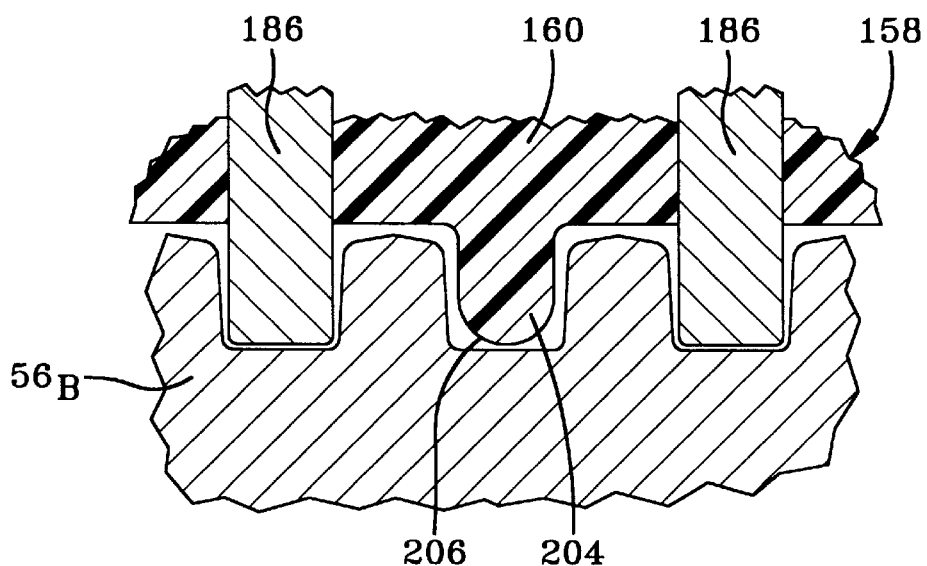
FIG. 9 is a further enlarged cross section appearing on the same sheet of drawings a FIG. 5 but taken substantially along line 9—9 of FIG. 8 to depict an alternative configuration for the adjusting member utilized in conjunction with the adjustably positionable terminal end fitting—said alternative configuration intended further to facilitate insertion of the dogs within the grooved end rod.

With reference to FIG. 9 it can be seen that one may, if desired, utilize a locating dog 204 that may be molded on the underside of the head portion 160 of the adjusting member 158. If the outer end of the locating dog 204 is rounded, as at 206, and if the locating dog 204 is slightly longer than the connecting dogs 186, the locating dog 204 will serve as a self-aligning member. That is, as the locating dog 204 engages the end rod $56_B$ in response to depression of the adjusting member 158 axially inwardly of the connecting ring 144, that engagement will effect relative movement between the housing 122 of the terminal end fitting 18 (and thus the adjusting member 158) and the end rod $56_B$ to align the aligning dog 204 with that groove 60 in closest proximity thereto and thus facilitate entry of the connecting dogs 186 into the appropriate grooves 60.

With reference now to FIGS. 10–15, the terminal end fitting 218 incorporates several structural variations from the previously described terminal end fitting 18. The variations incorporated in end fitting 218 do not inhibit the quick-release function as well as one which permits selectively positioning of the terminal end fitting 218 along the axis 120 of the end rod $56_B$. As depicted, the end fitting 218 has a housing 222, one end of which comprises a spherical, interacting portion 224 and a mounting portion 226 of virtually any desired exterior configuration that may be molded in situ through aperture 126 in the operating arm 124 of a remote controlled output device.

The interior of the mounting portion 226 is provided with a cylindrical central cavity 228, a portion of which is circumscribed by a concave race 140 that extends circumferentially about the interior of the interacting portion 224 rotatably to receive a toroidal connecting ring 144 such as been hereinbefore previously described. At this point it should be noted that inasmuch as the connecting ring 144 and its associated structure, such as the adjusting member 158, utilized in conjunction with terminal end fitting 218 are identical to several of the structural components utilized in conjunction with terminal end fitting 18, their description will not be repeated. In fact, any structural member, or component, utilized in conjunction with the alternative terminal end fitting 218 which is the same as a structural member, or component, used in conjunction with terminal end fitting 18 shall simply be identified by the same numerical designation.

The concave race 140 may terminate with a cylindrical access bore 229 which opens through the end of the interacting portion 224. A pair of diametrically opposed ports 230A and 230B penetrate the spherical wall 232 of the interacting portion 20 224, and said ports 230 are congruent with the concave race 140. As such, the end rod $56_B$ is permitted to rotate through the circumferential angular range that is defined by the circumferential extent of the opposed ports 230 as well as to swivel, in unison with the connecting ring 144, within those planes defined by the axial extent of the ports 230. As with the previously described terminal end fitting 18, circumferential extent of the opposed ports typically accommodates about 68° of relative rotation between the end rod $56_B$ (depicted as angle α on FIG. 11) and the interacting portion 224 of the end fitting 218 about the axis 234 of the spherical interacting portion 224. Similarly, the axial extent of the ports 230 typically permits the end rod $56_B$ to accommodate up to about plus or minus seven degrees (±7° designated as angle βon FIG. 14) of misalignment between the axis 120 of end rod $56_B$ and the axis 234 of the spherical interacting portion 224. This misalignment constitutes the angular disparity by which the axis 120 of the end rod $56_B$ fails perpendicularly to intersect the axis 234 of the spherical interacting portion 224.

The adjusting member 158 interacts with the connecting ring 144 in an identical manner to which the adjusting member 158 interacts with the connecting ring 144 received within the concave race 140 of the cylindrical interacting portion 130 in the previously described terminal end fitting 18.

Figure 11:
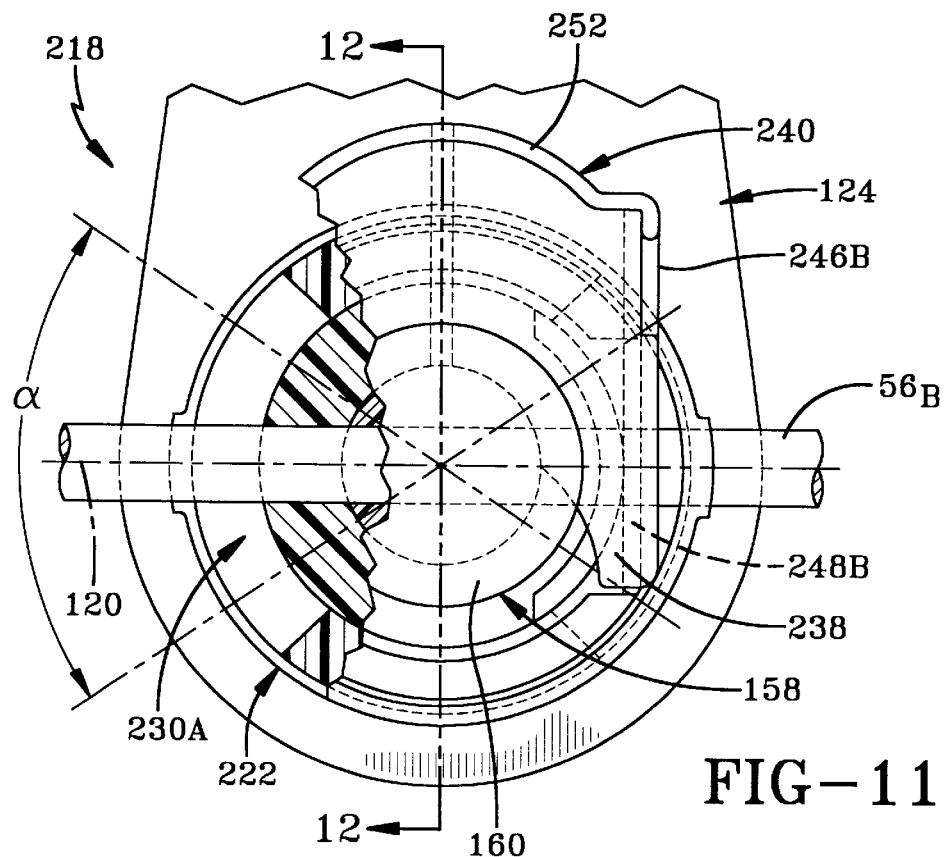
FIG. 11 is a plan view partially in section and partially broken away of the adjustably positionable terminal end fitting which is similar to FIG. 10 but which depicts the optionally employed locking clip in the "shipping position;"
Figure 13:
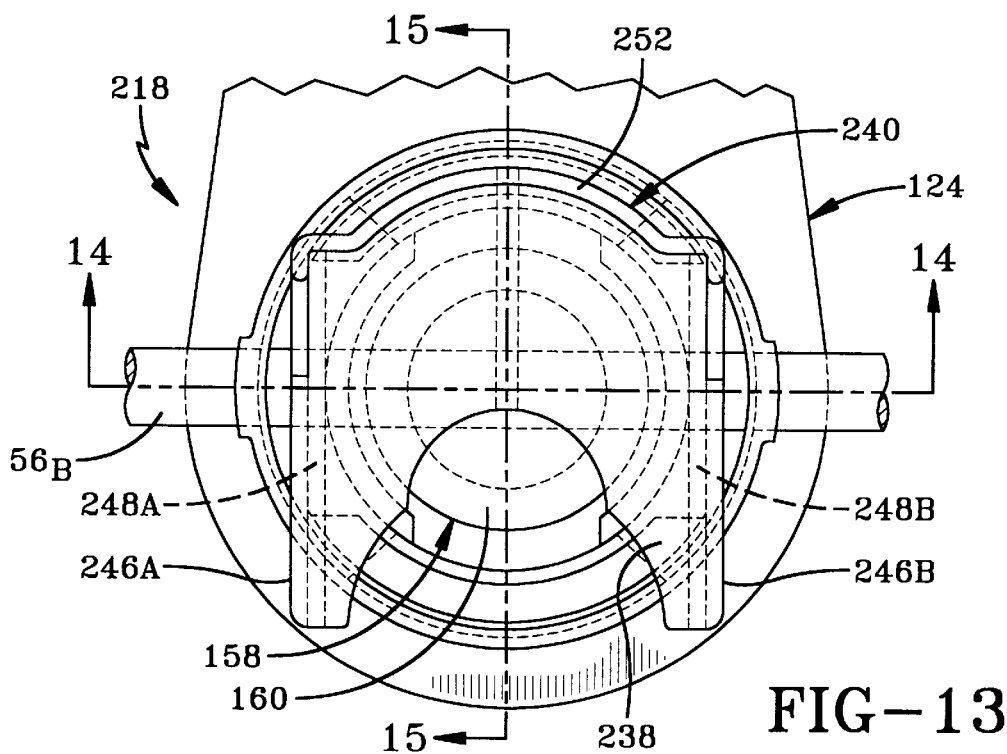
FIG. 13 is a plan view similar to FIGS. 10 and 11 of the alternative configuration for the adjustably positionable terminal end fitting, but which depicts the optional locking clip in the "anchor position" and appearing on the same sheet of drawings as FIG. 11.
Figure 12:
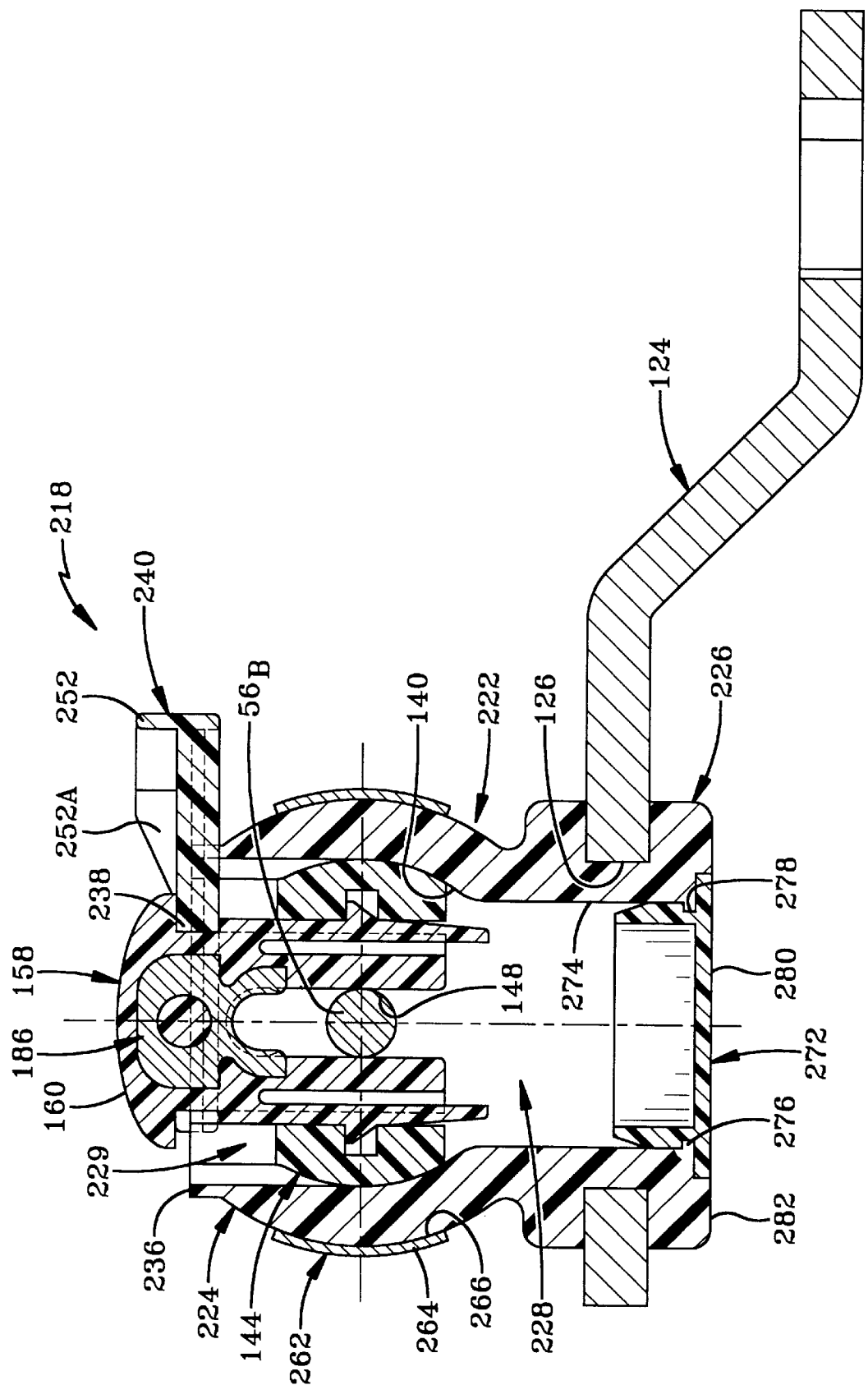
FIG. 12 is a cross section taken substantially along line 12—12 of FIG. 11.

With reference particularly to FIG. 11 and 12, it can be observed that when the pawls 174 are received within the transverse recesses 156 the adjusting member 158 is in the "shipping position." The end rod $56_B$ may freely slide axially within the bore 148 that extends transversely through the toroidal connecting ring 144 when the adjusting member 158 is in the shipping position.

It should be noted that when the adjusting member 158 is in the shipping position the head portion 160 of the adjusting member 158 is preferably disposed in spaced axial opposition with respect to the end surface 236 of the interacting portion 224 of the housing 222 having the spherical interacting portion 224.

With the head portion 160 of the adjusting member 158 disposed in spaced relation to the end surface 236 the web portion 238 of a locking clip 240 may be interposed between the head portion 160 and the end surface 236, as best seen in FIGS. 11 and 12, to prevent inadvertent further insertion of the adjusting member 158 within the interacting portion 224 of housing 222. The juncture of the ends 242 of the detent keys 168 and the arms 162 of the adjusting member 158 may each present a transverse shoulder 244, and the transverse shoulders 244 are axially displaced from the head portion 160. The transverse shoulders 244 are also aligned with the end surface 236 when the adjusting member 158 is in the shipping position, and as such the end surface 236 and the transverse shoulders 244 will, therefore, simultaneously engage the web portion 238 of the locking clip 240 to preclude inadvertent withdrawal of the adjusting member 158 with respect to the connecting ring 144, as will be hereinafter more fully explained.

As best seen in FIG. 4, the locking clip has a pair of opposed channels 240A and 240B that extend along the edges of the web portion 238. The channels 240A and 240B slidingly engage a pair of outwardly directed rails 248A and 248B, respectively, that are located adjacent to the end surface 236 on the interacting portion 224 of housing 222. Medially of the channels 246 a blocking rib 250 extends downwardly from the web portion 238 to engage the head portion 160 of the adjusting member 158 when the adjusting member 158 is in the anchor position depicted in FIGS. 13, 14 and 15. A handle 252 extends perpendicularly across the rear lateral extent of the web portion 238. In addition to providing a means by which to grasp and move the locking clip 240, the handle 252 also serves to impart lateral rigidity to the web portion 238 of the locking clip 240.

The lateral edges of the web portion 238 are preferably connected to the lateral edges of the handle 252 by flitch plates 254A and 254B. The flitch plates 254 may, of course, be integrally formed with the web portion 238 and the handle 252. In the configuration described, the flitch plates 254 serve not only to stabilize the handle 252 but also to impart longitudinal rigidity to the web portion 238.

To minimize the range of motion required for the locking clip 240 to permit the adjusting member to move between its two positions—i.e.: the shipping position and the anchoring position—the forward end of the web portion 238 may be relieved by three intersecting curvilinear edges 256A, 256B and 258. The opposed edges 256A and 256B are curved to preclude any interference between the locking clip 240 and the adjusting member 158 when the locking clip 240 has been moved laterally, along its own longitudinal axis 260, to the position depicted in FIG. 10. The third edge 258 of the three curvilinear edges is preferably semi-circular and may be centered along the longitudinal axis 260 of the locking clip 240 and is of such size as to permit insertion between the head portion 160 and the transverse shoulders 244A and 244B defined by the intersection of the detent keys 168 and the arms 162A and 162B of the adjusting member 158, as shown in FIGS. 11 and 12. So positioned, the locking clip 240 holds the adjusting member 158 in the shipping position, and the locking clip 240 is in what will be designated a its shipping position. When the locking clip 240 is in its shipping position, the adjusting member 158 may not be either further inserted in, or withdrawn from, the toroidal connecting ring 144.

Figure 10:
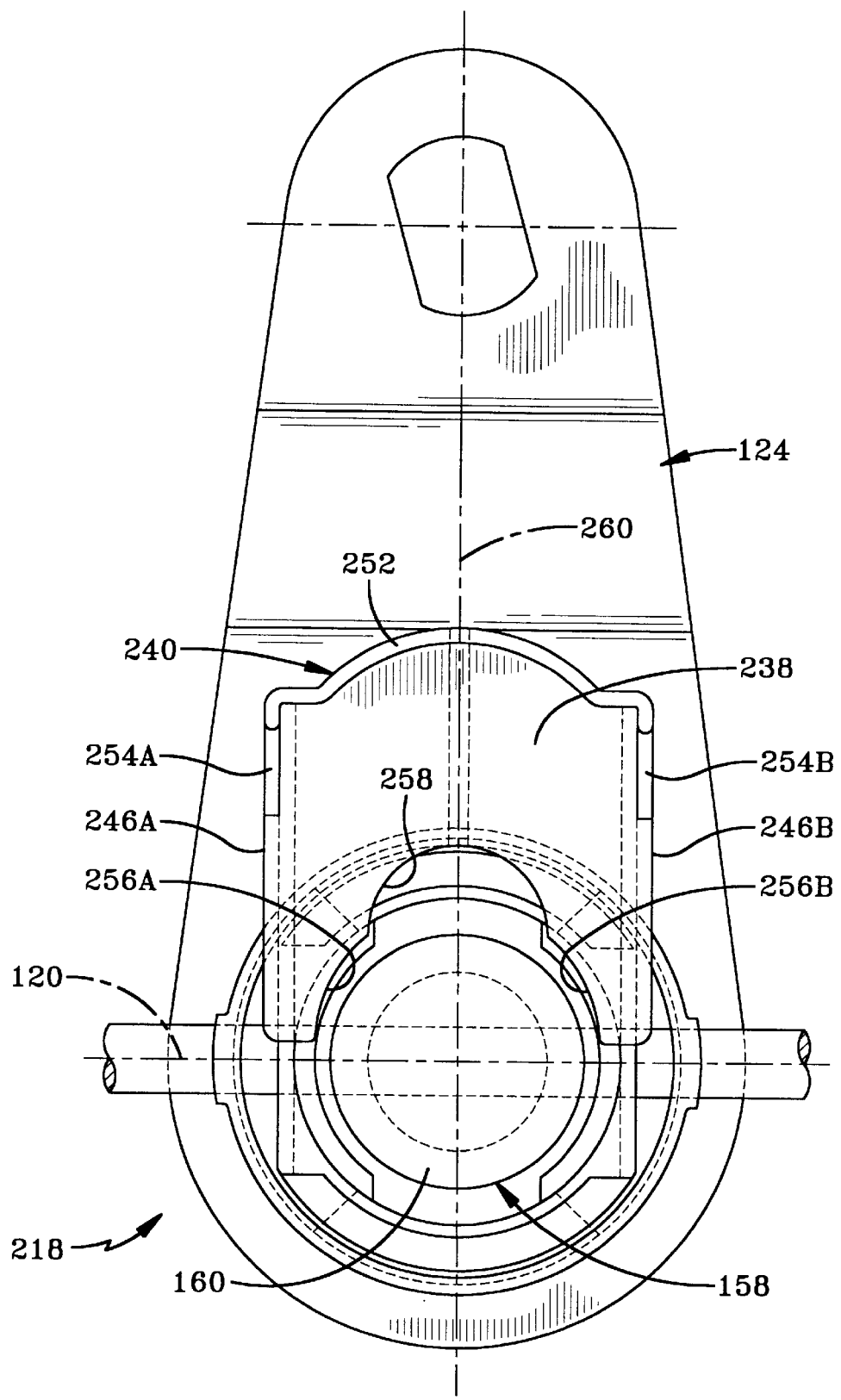
FIG. 10 is a plan view of an alternative configuration for the adjustably positionable terminal end fitting basically depicted in FIGS. 6–8 which alternative configuration depicts an optionally employed locking clip depicted in the "fully open position;"

In addition to a shipping position, the locking clip 240 also has an hereinafter described "anchor position" and an "open position." With the locking clip 240 in its open position depicted in FIG. 10, the adjusting member 158 is freely movable along its own axis—which is generally coincident with the axis 150 of the annular housing 122 or axis 234 of the spherical housing 222. Full insertion of the adjusting member 158 within the connecting ring 144 brings the head portion 160 of the adjusting member 158 into engagement with the end surface 236 of the housing 222. That is, when the locking clip 240 is in its open position, the head 160 of the adjusting member 158 may be pressed to bring the camming surface 180 on each the pawl 174 into engagement with the side walls 184 of the transverse recesses 156 and thereby swing the detent keys 168 into their respective ways 172, as previously described, so that the adjusting member 158 can be moved to its "anchor position." In its anchor position the adjusting member 158 will operatively engage the end rod $56_B$ to preclude axial movement of the end rod $56_B$ transversely with regard to the terminal end fitting 18 or 218. With the adjusting member 158 so disposed, the adjusting member 158 lockingly engages the end rod $56_B$, and the anchor clip 240 can be translated until the forward end of the blocking rib 250 engages the surface 260 on the cylindrical access bore 229, which not only further assures that the adjusting member 158 will be maintained in its anchor position but also serves to signal that the access bore 229 has been closed to the external environment by the web portion 238 of the locking clip 240. So positioned, the adjusting member 158 can not be moved along the axis 234 but can, of course, be circumferentially rotated, or transversely pivoted, with the toroidal connecting ring 144.

A sealing member 262 may be conveniently employed with the spherical interacting portion 224 of the terminal end fitting 218. The sealing member 262 has an annular belt portion 264 with at least a spherical inner surface 266 that engages the spherical wall 232 of the interacting portion 224 to permit circumferential, and transversely pivotal, movements of the sealing member 262 with respect to the interacting portion 224. The belt portion 264 is provided with diametrically opposed bores 268A and 268B that are circumscribed by tubular extensions 270A and 270B, respectively, which closely engage the end rod $56_B$ to preclude the admission of undesirable debris into the interior of the housing 222 and also to facilitate movement of the sealing member 262 with the end rod $56_B$ relative to the spherical wall 232 on the interacting portion 224 of terminal end fitting 218.

An end plug 272 may also be received within that portion of the central cavity 228 which opens through the mounting portion 226. Although a frictional fit between the plug 272 and the cylindrical interior wall 274 of the central cavity 228 may be sufficient to retain the plug 272 in most environments, one may, as shown, utilize a retaining flange 276 which extends radially inwardly from the cylindrical interior wall 274 of the mounting portion 226 to engage an annular recess 278 in the plug 272. As shown, the transverse exterior surface 280 of the plug 272 may be flush with the end surface 282 of the mounting portion 226 to assure clearance between the plug 272 and any exterior structure.

Conclusion

While one preferred embodiment, and several optional variations and accessories, of our present invention are disclosed, it is to be clearly understood that the invention is susceptible to numerous changes apparent to one skilled in the art. Therefore, the scope of the present invention is not to be limited to the details shown and described but is intended to include all changes and modifications which come within the scope of the appended claims.

As should now be apparent, the present invention not only teaches that a push-pull control cable assembly embodying the concepts of the present invention is capable of having the operative length of the core between the input device and the output device readily adjusted by employing at least one new and novel terminal end fitting configuration, but also that the other objects of the invention can be likewise accomplished.

I claim:

1. A selectively positionable terminal end fitting for a push-pull control cable assembly having a casing with a core slidably received in the casing to permit selective retention and release of a grooved end rod connected to one end of the push-pull control cable core, said terminal end fitting comprising:

a housing having a central cavity;

a race extending circumferentially of said central cavity within said housing;

ports opening transversely through said housing to intersect said race;

a toroidal connecting ring disposed transversely within said housing and received within said race for circumferential rotation and at least limited pivotal movement transversely of said race;

a transverse bore penetrating said connecting ring to receive the grooved end rod extending through said ports;

an adjusting member movable axially within said connecting ring;

a plurality of dogs mounted in said adjusting member operatively to engage the grooved end rod in response to axial movement of said adjusting member to preclude removal of the end rod from said transverse bore in said connecting ring.

2. The selectively positionable terminal end fitting for a push-pull control cable assembly, as set forth in claim 1, wherein:

said central cavity within said housing is cylindrically concave to receive said connecting ring.

3. The selectively positionable terminal end fitting for a push-pull control cable assembly, as set forth in claim 1, further comprising:

a central bore extending axially through said connecting ring;

said adjusting member having a head portion with a pair of arms extending outwardly of said head portion in generally parallel spaced relation to engage said central bore in said connecting ring;

said head portion engaging said connecting ring to define an anchor position for said adjusting member;

said dogs adapted operatively to engage said grooved end rod when said adjusting member is in its anchor position;

a saddle formed between said arms in proximity to said head portion; said dogs received in said saddle.

4. The selectively positionable terminal end fitting for a push-pull control cable assembly, as set forth in claim 3, further comprising:

a guide rib disposed between said arms in said saddle;

said dogs being positioned laterally of said guide rib.

5. The selectively positionable terminal end fitting for a push-pull control cable assembly, as set forth in claim 1, wherein:

said central cavity within said housing is spherically concave to receive said connecting ring.

6. The selectively positionable terminal end fitting for a push-pull control cable assembly, as set forth in claim 5, further comprising:

a sealing ring;

said sealing ring having a spherical surface to engage said spherical housing;

said sealing ring adapted to be connected to said grooved end rod;

said sealing ring being both circumferentially and transversely rotatable of said spherical housing to move with said end rod received within the transverse bore in said connecting ring.

7. The selectively positionable terminal end fitting for a push-pull control cable assembly, as set forth in claim 5, further comprising:

a plug removably mounted within said central cavity to preclude admission of undesired debris into said central cavity.

8. The selectively positionable terminal end fitting for a push-pull control cable assembly, as set forth in claim 5, further comprising:

a locking clip;

said locking clip being supported from said housing to permit selective movement of said adjusting member between at least a shipping position and an anchor position.

9. The selectively positionable terminal end fitting for a push-pull control cable assembly, as set forth in claim 3, wherein:

said locking clip selectively secures said adjusting member in said shipping position as well as within said anchor position.

10. The selectively positionable terminal end fitting for a push-pull control cable assembly, as set forth in claim 8, further comprising:

a plug removably mounted within said central cavity;

said locking clip and said plug combining to preclude admission of undesired debris into said central cavity.

* * * * *

UNITED STATES PATENT AND TRADEMARK OFFICE
CERTIFICATE OF CORRECTION

PATENT NO. : 6,021,689 Page 1 of 1
APPLICATION NO. : 09/300896
DATED : February 8, 2000
INVENTOR(S) : Bruce H. Moore It is certified that error appears in the above-identified patent and that said Letters Patent is hereby corrected as shown below:

Column 16, at claim 9, line 51, "3" should read --8--.

Signed and Sealed this

Seventeenth Day of July, 2007

JON W. DUDAS
*Director of the United States Patent and Trademark Office*